United States Patent [19]

Hahn et al.

[11] 4,138,528
[45] Feb. 6, 1979

[54] ARTICLES COATED WITH AN AMINOPLAST POLYFUNCTIONAL RESIN COMPOSITION

[75] Inventors: Frank J. Hahn, Wilbraham; James O. Santer, East Longmeadow, both of Mass.

[73] Assignee: Monsanto Company, St. Louis, Mo.

[21] Appl. No.: 786,171

[22] Filed: Apr. 11, 1977

Related U.S. Application Data

[62] Division of Ser. No. 572,037, Apr. 28, 1975, Pat. No. 4,031,057.

[51] Int. Cl.$^2$ .................... B32B 27/06; B32B 27/00
[52] U.S. Cl. ...................... 428/482; 260/32.4 X; 260/32.6 R; 260/33.2 R; 260/850; 260/851; 427/385 R; 427/388 B; 428/458; 428/460; 428/463; 428/522; 428/524
[58] Field of Search ............ 427/388 B, 358, 385 R; 428/460, 524, 458, 463, 480, 522, 482; 260/32.6 R, 32.4 R, 33.2 R, 850, 851

[56] References Cited

U.S. PATENT DOCUMENTS

| | | | |
|---|---|---|---|
| 3,061,563 | 10/1962 | Zdanowski et al. | 427/388 B |
| 3,183,282 | 5/1965 | Harwitz | 260/851 |
| 3,230,111 | 1/1966 | Hall et al. | 427/388 B |
| 3,369,931 | 2/1968 | Beachem et al. | 428/254 |
| 3,370,975 | 2/1968 | Semroc | 427/388 B |
| 3,657,001 | 4/1972 | Parker | 427/388 B |
| 3,668,277 | 6/1972 | Reimhofer et al. | 260/850 |
| 3,922,447 | 11/1975 | Isaksen et al. | 260/850 |

FOREIGN PATENT DOCUMENTS

| | | | |
|---|---|---|---|
| 229106 | 4/1959 | Australia | 427/388 B |
| 872581 | 7/1961 | United Kingdom | 427/388 B |

*Primary Examiner*—Ronald H. Smith
*Assistant Examiner*—Thurman K. Page
*Attorney, Agent, or Firm*—R. Bruce Blance; William J. Farrington; James C. Logomasini

[57] ABSTRACT

Articles coated with a thermoset reaction product of a liquid resin composition comprising a reactive polymer and an N,N'-bis(alkoxymethyl)uron such as N,N'-bis(-butoxymethyl)uron. The reactive polymer contains reactive groups such as hydroxyl and carboxyl and is of molecular weight in the range 300 to 5000. The uron ether is employed as a cosolvent for the polymer whereby the solution may be applied as a coating without the need for significant amounts of conventional solvents. Interaction between the polymer and the uron ether promoted by heat in the presence of acid catalyst shifts the role of the uron ether to that of a crosslinking agent for the polymer.

4 Claims, No Drawings

ARTICLES COATED WITH AN AMINOPLAST POLYFUNCTIONAL RESIN COMPOSITION

This is a division of application Ser. No. 572,037 filed Apr. 28, 1975 and now U.S. Pat. No. 4,031,057.

BACKGROUND OF THE INVENTION

1. Field of the Invention

This invention is in the field of liquid compositions containing high concentrations of active ingredients which are useful in the preparation of surface coatings. More particularly this invention relates to compositions containing bis-(alkoxymethyl)urons and reactive polymers containing hydroxyl or carboxyl groups.

2. Description of the Prior Art

Surface coating compositions containing polyfunctional resins and aminoplast crosslinking agents are well known in the art. In general the polyfunctional resin is of high molecular weight and is compounded with the aminoplast in solution in an organic solvent to provide a solution containing between 10 and 50 weight percent of active ingredients, i.e., the ingredients which interact to provide high molecular weight crosslinked resins when the solvent is driven off and the residue is baked. Alternatively the polyfunctional resin may be prepared as an aqueous dispersion in water or a "non-aqueous" dispersion in an organic liquid which is a non-solvent for the resin and the dispersion is compounded with the aminoplast crosslinking agent. Like the coating solutions, non-aqueous dispersions yield large quantities of organic vapors when they are dried and present an air pollution problem. Moreover aqueous and non-aqueous dispersions may not flow adequately at the baking step so that the surface coatings lack gloss and coherence and do not provide adequate corrosion protection. Also aqueous systems tend to blister at the drying step.

Dry powder compositions containing low molecular weight polyfunctional resins and aminoplasts have been developed in recent times to eliminate the organic liquid from coating compositions. Such powders are applied by electrostatic or fluidized bed processes. However, the powders tend to flow and clump in storage and become difficult to apply uniformly and evenly or they lack adequate flow at the baking temperature so that they also provide coatings which lack gloss and coherence.

A need therefore exists for surface coating compositions which comprise polyfunctional resins and aminoplast crosslinking agents as the active ingredients, in which the organic moiety is comprised of at least 80 volume percent of these active ingredients and which is liquid at room temperature. A further need exists for such liquid compositions which can be applied by disc or bell spray, by knife or roll coat or by air spray.

SUMMARY OF THE INVENTION

These needs are filled by the present invention which is directed to compositions of matter wherein at least 80 volume percent of the organic moiety comprises a thermosettable solution of an N,N'-bis(alkoxymethyl)uron and a polyfunctional resin wherein the solution viscosity at 25° C. is less than 1000 centipoises, wherein the alkyl radicals of the alkoxy groups of the uron are selected from the group consisting of $C_1$ to $C_6$ alkyl radicals and wherein the polyfunctional resin contains sufficient alcoholic hydroxyl and carboxyl groups to provide a functionality greater than 2 and has a number average molecular weight in the range of 300 to 5000.

Another aspect of the invention is directed to a process for coating an article which comprises blending an N,N'-bis-(alkoxymethyl)uron and a polyfunctional resin to form a homogeneous solution, applying a film of the solution to a surface of the article, and baking the article at a temperature sufficient to thermoset the solution, wherein the alkyl radicals of the alkoxy groups of the uron are selected from the group consisting of $C_1$ to $C_6$ alkyl radicals, and wherein the polyfunctional resin contains sufficient alcoholic hydroxyl and carboxyl groups to provide a functionality greater than 2 and has a number average molecular weight in the range of 300 to 5000, and wherein the solution viscosity at 25° C. is less than 1000 centipoises.

A further aspect of the invention is directed to coated articles comprising a substrate coated with a cured film of a resin composition comprising N,N'-bis(alkoxymethyl)uron and a polyfunctional resin in the weight ratio of 30:70 to 70:30, wherein the alkyl radicals of the alkoxy grcups of the uron are selected from the group consisting of $C_1$ to $C_6$ alkyl radicals and wherein the polyfunctional resin contains sufficient alcoholic hydroxyl and carboxyl groups to provide a functionality greater than 2 and has a number average molecular weight in the range of 300 to 5000.

In contrast to conventional solvent based coating systems based upon aminoplasts such as urea formaldehyde ethers and melamine formaldehyde ethers and polymeric coreactants, the very low molecular weight uron ethers employed herein are designed and employed to serve initially as a cosolvent for the polyfunctional resin whereby the solution may be applied as a coating without the need for significant amounts of conventional solvents. After application, interaction between the polyester and the uron ether promoted by heat in the presence of acid catalyst shifts the role of the uron ether to that of a crosslinging agent for the polyfunctional resin, whereby it becomes fixed as a structural moiety in the film. This dual role usage of a specially tailored uron ether with a low molecular weight polyfunctional resin provides an approach to pollution control.

THE PREFERRED EMBODIMENTS

The aminoplast component of the liquid compositions of the present invention is an N,N'-bis(alkoxymethyl)uron of the following structure:

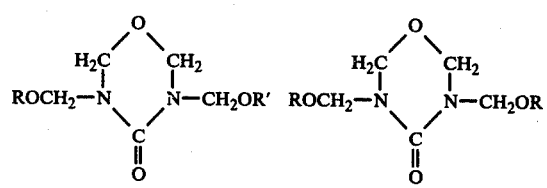

wherein R and R' represent $C_1$ to $C_6$ alkyl radicals such as methyl, ethyl, n-propyl, isopropyl, n-butyl, isobutyl, and hexyl. The preferred urons are N,N'-bis(methoxymethyl)uron and N,N'-bis(butoxymethyl)uron.

The alkoxymethyl urons are preferably prepared by reaction of urea at moderate temperatures with aqueous formaldehyde under basic conditions for example in the presence of sufficient alkali metal hydroxide such as sodium hydroxide to raise the pH above 10. The reaction medium is neutralized and distilled to remove water and is then etherified under strongly acidic conditions in the presence of alkanol at temperatures below 50° C. to minimize condensation reactions. The acid is neutralized and water and excess alkanol are stripped off to yield a crude uron product which after filtration contains at least 90 weight percent uron. The crude product may be distilled under reduced pressure to yield essentially pure N,N'-bis(alkoxymethyl)uron but for the purposes of the invention crude product containing at least 70 weight percent uron has been found to be satisfactory when it is used as the preponderant component of the polyester uron liquid compositions of the present invention. The remainder of the crude product comprises non-cyclic urea/formaldehyde/alkanol condensation products. The polyfunctional resin component can be a conventional polyester condensation product prepared by reacting a polycarboxylic acid including dicarboxylic acids with a polyhydric alcohol, including the glycols. The polycarboxylic acids may be either saturated, i.e., free of non-benzenoid unsaturation, or they may be ethylenically unsaturated. The number average molecular weight of the polyester is in the range of 300 to 5000. The components of the polyester are selected so that solubility in or compatibility with the uron ether is obtained. Thus particularly when the molecular weight is high a substantial portion of the polycarboxylic acid, preferably a molar preponderance, should be aliphatic such as succinic, glutaric and adipic acids. The polyester resin is prepared from ingredients containing alcoholic hydroxyl groups in molar excess over carboxyl groups, there being sufficient polycarboxylic acid or polyol to ensure that the polyester contains sufficient alcoholic hydroxyl and carboxyl groups to provide a functionality greater than 2 so that it is thermosettable upon reaction with the uron ether. The functionality is readily selected within the skill in the art to ensure that the thermoset composition has the appropriate level of physical properties such as flexibility and solvent resistance. The ingredients are permitted to react until the hydroxyl number is in the range of about 20 to about 400 and the acid number is in the range of about 1 to 25, preferably about 3 to 10. The polyester resins are prepared by the general techniques employed in the preparation of polyester resins. They can be conveniently made by stirring the reactants together and heating them while stirring, to a temperature of about 250° C., while an inert gas (e.g., nitrogen) is continuously passed through the reaction mixture to minimize color formation and to remove the low boiling condensation products formed during the esterification reaction. The polyesters are viscous liquids at room temperature or low melting solids which dissolve in the uron ether component of the compositions of the present invention to yield liquids at room temperature.

The polyfunctional resin can be a low molecular weight acrylic resin prepared by copolymerizing monomers such as methyl acrylate, ethyl acrylate, propyl acrylate, butyl acrylate, octyl acrylate, decyl acrylate, lauryl acrylate, methyl methacrylate, ethyl methacrylate, butyl methacrylate, heptyl methacryate, decyl methacrylate, methyl ethacrylate and the like with acidic comonomers such as acrylic acid, methacrylic acid, crotonic acid, maleic acid, fumaric acid, itaconic acid and the like, or with alcoholic hydroxy comonomers such as the hydroxyalkyl esters of $\alpha,\beta$-unsaturated mono- and di-basic acids, for example 2-hydroxyethyl acrylate, 2-hydroxypropyl acrylate, 2-hydroxyethyl methacrylate, 3-hydroxypropyl crotonate, bis-(2-hydroxyethyl) maleate, and the like, or with mixtures of such acidic comonomers and alcoholic hydroxy comonomers.

The acrylic resins are conveniently made by conventional free-radical polymerization techniques, in bulk, solution or emulsion systems with recovery of the resin by conventional removal of unreacted monomer, solvent or water. Chain transfer agents are employed to limit the number average molecular weight to the range of from 300 to 5000. The monomers and ratio of monomers are selected so that the resin contains sufficient hydroxyl and carboxyl groups per molecule to provide a functionality greater than 2 and so that the resin is soluble in or compatible with the uron ether. Still further, one can use such polymerizable compounds in the acrylic resin as styrene, alkyl styrenes such as o-, m- or p-methylstyrene, halostyrenes such as o-, m-, or p-chlorostyrene, acrylonitrile, methacrylonitrile, vinyl chloride, vinylidene chloride and vinyl esters such as vinyl acetate, vinyl propionate or vinyl octoate provided no more than 50 percent by weight of the acrylic resin comprises such monomers and provided that the aforementioned criteria are satisfied, namely solubility in or compatibility with the uron ether, molecular weight and content of reactive groups to provide the appropriate level of reactivity and physical properties.

In preparing the thermosettable resin compositions according to the present invention, the reactive polymer and the uron ether are mixed together by any convenient means at a temperature preferably below 35° C. until a uniform solution is obtained. The two components of the composition are considered to be compatible if a substantially clear solution is obtained which does not form separate phases upon standing for twenty four hours at room temperature.

The viscosity of the resin composition of the present invention can be critical in surface coating applications depending upon the method of application. Thus when disk or bell spray application is used the viscosity should be less than 1000 centipoises at 25° C. For knife or roll coating, the viscosity should be less than 550 centipoises at 25° C. and for air spray application the viscosity should be less than 200 centipoises at 25° C. Viscosity is conveniently measured on a Brookfield LVF rotating spindle viscosimeter equipped with the appropriate spindle or by the Gardner-Holdt method.

In formulating the compositions of the present invention, ratios of the uron ether and polyfunctional resin are selected so that the composition is thermosettable and the viscosity is suitable for the method of application and is in no case greater than 1000 centipoises. Since the viscosity of the uron ether is usually less than 100 centipoises while the viscosity of the polyester may be substantially more than 1000 centipoises, it is preferred to formulate compositions containing a substantial amount of uron ether. Excessive amounts of uron ether are undesirable however, because the physical properties, such as flexibility and solvent resistance of the thermoset compositions may be impaired. The preferred ratio of uron ether to polyfunctional resin is therefore in the range of about 30:70 to about 70:30 parts by weight. Particularly with the lower molecular weight polyfunctional resins and high ratios of uron ether to polyfunctional resin, the compositions possess viscosities which can be in the range of 200 centipoises or less although there are no organic solvents or dilutants present. Moreover small quantities, up to 20 volume percent, of organic solvents may be added to the compositions to provide viscosities substantially less than 100 centipoises without increasing the pollution load excessively. The compatibility of solvents can be readily ascertained by addition of small quantities of solvent to the liquid resin composition. In general solvents of medium or high polarity, boiling in the range of 75° to 120° C. are suitable, such as the lower alkanols containing 2 to 5 carbon atoms, particularly n-propyl, isopropyl, n-butyl and iso-butyl alcohols, the lower ketones such as methyl ethyl ketone and the glycol ethers such as ethylene glycol monomethyl ether and ethylene glycol monobutyl ether. While water may be used as a solvent, it is generally not satisfactory because it induces blister formation at the drying and curing step and it causes incompatibility between the uron ether and the polyfunctional resin when the latter is of high molecular weight.

The homogeneous resin compositions may also include various well-known functional modifiers such as curing agents or accelerators, flow control agents, surface active agents, heatstable organic or inorganic pigments, inert fillers, inhibitors, abrasives and plasticizers in their usual effective proportions. Also, small amounts of other resins or other organic compounds to improve film-forming properties may be incorporated. It will be understood that the amount of these substances must be such that the viscosity remains suitable for the intended application and that the physical properties of the compositions and cured coating are not impaired, and in no case should the organic moiety of the composition contain more than 20 volume percent of these substances and viscosity reducing solvents.

Because the thermosetting reaction between the uron ether groups and the reactive groups of the polyfunctional resin tends to be rather sluggish, the reaction should generally be conducted in the presence of a small amount of an acid or acidic salt as catalyst under such conditions that the alkanol formed by the condensation will be expelled. This is conveniently accomplished by carrying out the reaction above the boiling point of the alkanol. Catalysts contemplated for use in the condensation reaction include the strong acids with pK less than 2.5 and salts of such strong acids and weak bases. The preferred catalysts include sulfuric acid, hydrochloric acid, benzene sulfonic acid, p-toluenesulfonic acid, dimethyl sulfate, and ammonium chloride. The amount of catalyst may vary widely although for satisfactory results, amounts within the range of about 0.05 to 0.6 weight percent of the uron ether are adequate. The catalyst is conveniently added as a liquid or a concentrated solution in a suitable solvent to the liquid resin compositions immediately prior to their use.

The thermosettable liquid resin compositions of the present invention are useful in surface coating applications, as molding compounds and laminating resins.

When the liquid resin compositions are used as surface coatings, they are applied as thin films to suitable substrates and are preferably cured at a temperature in the range of 120° C. to 250° C. for a period of 10 to 60 minutes. The curing treatment is preferably carried out for 20 to 40 minutes at 150° to 200° C. The thickness of the cured film may be varied in the range of 0.5 mil to 20 mil.

For test purposes, films of 1.0 mil thickness on Bonderized 37 mild steel panels are used. The baked cured panels are aged overnight at 77° ± 2° F. and 50 percent relative humidity. The coatings are evaluated for appearance including pinholes, craters and abnormal roughness. They are tested by the following procedures:

(A) IMPACT TEST

The reverse impact test involves a two-pound rod with a nominal diameter of 1 inches and a length of 18 inches having a hemispherical tip of ¼ inches radius. The rod is dropped vertically a certain number of inches on the uncoated side of the panel and the ability of the panel to deform is measured versus the ability of the coating to withstand this deformation without cracking. The panel on impact deforms into a cup deformation. The rounded cup is tested by placing a pressure-sensitive cellophane tape of 0.5 inch in width over the raised cup. The cellophane tape is stripped to determine whether or not the coating has lost its adhesion during the deformation. The rod is dropped from various heights and the test has a readout of inch-pounds versus adhesion of the coating.

(B) RUB TEST

A pool of solvent is placed on the coated panel. The coating is rubbed gently with a cheesecloth covered finger. The number of rubs before the coating begins to be removed is noted.

(C) PENCIL HARDNESS TEST

The coated side of the panel is placed face-up on a flat surface. The operator presses down and forward on the panel with pencils of varying hardness. The panel fails when the lead penetrates the coating and the hardness rating is determined by that pencil hardness which does not gouge the film. The range of hardness for pencils ranges from 6B, being the softest, to 9H, being the hardest, i.e., 6B to B, HB, F, H to 9H. The combination coatings taught vary in hardness from 4B to 2H. Hardness of H or better is preferred.

(D) WATER RESISTANCE

Coated panels are immersed in water at 40° C. and are examined periodically for vertical edge whitening which is an indication of water penetration, and blistering according to the criteria of ASTM test procedure D714-56. After 15 days of immersion, the coatings are subjected to a stripping test with a cellophane pressure-sensitive tape of 1 inch width, sold by the 3M Company under the tradename "710 Scotch Tape". The coatings are acceptable if less than 10 percent is removed from the panel after the stripping test.

The invention is illustrated by the following examples which are not intended to be restrictive of the invention described herein. Unless otherwise stated, all parts and percentages are by weight.

EXAMPLE 1

PREPARATION OF N,N'-BIS(N-BUTOXYMETHYL)URON

Fifty percent formaldehyde (602 parts) is charged to a kettle, and made alkaline by addition of 50% aqueous sodium hydroxide (22 parts). External cooling is applied so that the temperature does not exceed 40° C. Urea (100 parts) is added, and the reaction mixture is heated under vacuum to maintain a steady reflux at 60° C. After 45 minutes, the reaction medium is cooled, neutralized to a pH in the range of 6.5 to 7.5 by addition of formic acid, and distilled under vacuum (26 inches mercury) to 70° C. The aqueous distillate is approximately 260 parts. Butanol (876 parts) is added to the residue and the temperature is adjusted to 35° C. Concentrated sulfuric acid (22 parts) is added. External cooling is applied so that the exotherm does not raise the batch temperature above 40° C. and this temperature is maintained for 1-½ hours, after which the batch is neutralized by addition of 50% aqueous NaOH (approximately 13 parts). Water and unreacted butanol are removed by vacuum distillation (26 inches mercury) to an end temperature of 125° C. The product is filtered to give a water-white liquid of viscosity <100 cps at 25° C. Yield is about 470 parts. The uron content is greater than 90 percent.

EXAMPLE 2
PREPARATION OF N,N'-BIS(METHOXYMETHYL)URON

Fifty percent aqueous formaldehyde (647 parts) is charged to a kettle, and made alkaline by addition of 50% aqueous sodium hydroxide (2.64 parts). Urea (100 parts) is added and water is removed by vacuum distillation (a) to 90° C. at 15 inches Hg. then (b) to 110° C. at 26 inches Hg. A total of 408 parts aqueous distillate is removed. The batch is cooled, and methanol (1111 parts) added. At this point the batch temperature is about 30° C. Concentrated HCl (8.9 parts) is added, and external cooling applied so that the batch temperature does not exceed about 40° C. This temperature is maintained for one hour. The reaction is neutralized to pH 10.0 with 50% aqueous sodium hydroxide (3.75 parts), then distilled to remove water and unreacted methanol and formaldehyde. The end temperature is 105° C. at 26 inches Hg. After filtration, a water-white liquid of <100 cps viscosity at 25° C. is obtained. Yield is about 312 parts. The uron content is greater than 90 percent.

EXAMPLE 3
PREPARATION OF POLYESTER

Trimethylolpropane (432 parts), benzoic acid (197 parts) and ethylene glycol (21 parts) are charged to a kettle fitted with stirrer, thermometer, condenser, and water trap. The trap is filled with xylene, and additional xylene (56 parts) is added to the kettle. The mixture is heated, with stirring under a nitrogen atmosphere, to 125° C. Adipic acid (350 parts) is added, and heating continued. At 155° C., water begins collecting in the trap. During the next three hours, the batch temperature is raised to 245° C., and a total of 124 parts water is collected in the trap. The apparatus is then set for distillation, and 37 parts xylene is removed. The batch is cooled. A liquid polyester of Acid No. 3.8 containing 96.4 percent non-volatile material is obtained

EXAMPLES 4–10
PREPARATION OF POLYESTERS

Several liquid polyesters are prepared by the method set forth in Example 3. The ratios of reactants and properties of the polyesters are set forth in Table I.

TABLE I
PREPARATION OF LIQUID POLYESTERS

| EXAMPLE | 4 | 5 | 6 | 7 | 8 | 9 | 10 |
|---|---|---|---|---|---|---|---|
| CHARGE MOLS | | | | | | | |
| Adipic Acid | 1.0 | 1.0 | 1.0 | 1.5 | 1.25 | 1.15 | 1.5 |
| Phthalic Anhydride | 0.5 | 0.5 | 0.5 | | 0.25 | 0.35 | |
| Trimethylol Propane | 2.0 | 2.0 | 2.0 | 2.5 | 2.0 | 2.0 | 2.5 |
| Ethylene glycol | 0.2 | 0.2 | 0.2 | | 0.2 | 0.2 | |
| Benzoic Acid | 1.0 | | | 1.0 | 1.0 | 1.0 | 1.0 |
| Tall Fatty Acids | | 1.0 | | | | | |
| Lauric Acid | | | 1.0 | | | | 0.2 |
| POLYESTER PROPERTIES | | | | | | | |
| Solids | 96.8 | 98.67 | 97.95 | 98.35 | | 97.1 | 98.29 |
| Acid No. | 6.15 | 2.9 | 4.45 | 4.05 | 4.7 | 4.56 | 4.05 |

EXAMPLES 11–19

Thermosettable liquid resin compositions are prepared by forming solutions of the polyesters of Examples 3–10 in the uron ether of Example 1. The weight ratio of polyester to uron ester is 1:2. The viscosities of the compositions range from 240 to 900 centipoises. The compositions are applied to Bonderized 37 mild steel panels by knife coating and are cured at 120° C. or 150° C. in the presence of p-toluene sulfonic acid catalyst (0.08%) to provide cured films of 1 mil thickness. The cured films are evaluated by the tests set forth above in the specification. The data are presented in Table II. Data for a conventional coating prepared from polyester (Example 3) and a butylated methylol urea sold by Monsanto Company under the tradename Resimene 901 are included for comparison as Example 12. Although the concentration of active ingredients in Example 12 is only 62.5 percent, the remainder being xylene and butanol, the viscosity is 1500 centipoises.

TABLE II
EVALUATION OF SURFACE COATINGS

| Liquid Resin Composition | 11 | 12 | 13 | 14 | 15 | 16 | 17 | 18 | 19 |
|---|---|---|---|---|---|---|---|---|---|
| Aminoplast:polyester | 2:1 | 1:1 | 2:1 | 2:1 | 2:1 | 2:1 | 2:1 | 2:1 | 2:1 |
| Polyester No. | 3 | 3 | 4 | 5 | 6 | 7 | 8 | 9 | 10 |
| Viscosity, centipoises | 600 | 1500 | 500 | 240 | 300 | 550 | 600 | 600 | 900 |
| Active ingredients, % | 96.4 | 62.5 | 96.8 | 98.7 | 98.0 | 98.4 | — | 97.1 | 98.3 |
| Properties after bake at 120° C. for 30 minutes | | | | | | | | | |
| Pencil Hardness | F | F | F | 4B | B | F | F | F | F |
| Reverse impact inch pounds | 160 | 160 | <20 | 160 | 160 | 160 | 160 | 140 | <20 |
| MEK Rub resistance | 45 | — | 50 | 30 | 160 | — | 60 | 50 | — |
| Water Resistance, 40° C. | | | | | | | | | |
| ASTM Blister, 6 days | 9F | | 9M | 8–9D | 9F | | 9M | 9M | |
| Tape Strip, 15 days | 3% | 100% | 5% | Dest. | 2% | 100% | 7% | 30% | negl. |
| Properties after bake at 150° C. for 30 minutes | | | | | | | | | |
| Pencil Hardness | 2H | 2H | 2H | B | F | 2H | 2H | 2H | H |
| Reverse impact inch pounds | 140 | <20 | 20 | 170 | 160 | 160 | 140 | 40 | <20 |
| MEK Rub resistance | >200 | — | >200 | 170 | >200 | — | >200 | >200 | — |
| Water Resistance, 40° C. | | | | | | | | | |
| Tape Strip, 15 days | 18% | 45% | 45% | 10% | none | 70% | 7 | 75 | none |

EXAMPLE 20

This Example sets forth a comparison of the viscosity of liquid resin compositions containing polyester and an aminoplast selected from commercially available methoxymethyl melamines, a commercially available methoxymethyl urea, a commercially available butoxymethyl urea, and the N,N'-bis(butoxymethyl)uron of Example 1 and the N,N'-bis(methoxymethyl)uron of Example 2, demonstrating the significantly lower viscosities of the liquid compositions of the present invention.

TABLE III
COMPARISON OF VISCOSITIES
OF POLYESTER-AMINOPLAST COMPOSITIONS

| Polyester : Aminoplast | 2:1 | 1:2 | 0:1 |
|---|---|---|---|
| Polyester/Methoxymethylurea | 6000 cps | 5000 cps | 5200 cps |
| Polyester/Methoxymethylmelamine | 4600 | 2300 | 2400 |
| Polyester/Methoxymethylmelamine | 3500 | 1700 | solid |
| Polyester/N,N'-bis(methoxymethyl) uron | 2000 | 620 | 200 |
| Polyester/N,N'-bis(butoxymethyl) uron | 1600 | 420 | 100 |

EXAMPLE 21

This Example sets forth the effect of addition of n-propyl alcohol to a liquid resin comprising polyester and N,N'-bis(butoxymethyl)uron in the weight ratio of 1:2. The viscosity of the liquid resin composition is 420 centipoises at 25° C. Addition of n-propyl alcohol (12 weight percent) reduces the viscosity to 15 centipoises.

What is claimed is:

1. An article of manufacture comprising a substrate coated with a cured film of a resin composition comprising N,N'-bis(alkoxymethyl) uron and a polyfunctional resin in the weight ratio of 30:70 to 70:30, wherein the alkyl radicals of the alkoxy groups of the uron are selected from the group consisting of $C_1$ to $C_6$ alkyl radicals and wherein the polyfunctional resin contains sufficient alcoholic hydroxyl and carboxyl groups to provide a functionality greater than 2 and has a number average molecular weight in the range of 300 to 5000.

2. The article of manufacture of claim 1 wherein the alkyl radicals are methyl or butyl.

3. The article of manufacture of claim 1 wherein the polyfunctional resin is a polyester.

4. The article of manufacture of claim 1 wherein the polyfunctional resin is an acrylic resin.

* * * * *